(12) United States Patent
Zhao et al.

(10) Patent No.: US 12,439,176 B2
(45) Date of Patent: Oct. 7, 2025

(54) CONTROL METHOD OF HIGH GAIN IMAGE SENSOR

(71) Applicant: GALAXYCORE SHANGHAI LIMITED CORPORATION, Shanghai (CN)

(72) Inventors: Lixin Zhao, Shanghai (CN); Jingwei Wei, Shanghai (CN); Yuhao Wen, Shanghai (CN); Huaizhao Li, Shanghai (CN)

(73) Assignee: GALAXYCORE SHANGHAI LIMITED CORPORATION, Shanghai (CN)

( * ) Notice: Subject to any disclaimer, the term of this patent is extended or adjusted under 35 U.S.C. 154(b) by 0 days.

(21) Appl. No.: 18/994,566

(22) PCT Filed: Jul. 20, 2023

(86) PCT No.: PCT/CN2023/108311
§ 371 (c)(1),
(2) Date: Jan. 14, 2025

(87) PCT Pub. No.: WO2025/007372
PCT Pub. Date: Jan. 9, 2025

(65) Prior Publication Data
US 2025/0267376 A1 Aug. 21, 2025

(30) Foreign Application Priority Data

Jul. 4, 2023 (CN) .......................... 202310816052.5

(51) Int. Cl.
*H04N 25/51* (2023.01)
*H04N 25/616* (2023.01)
(Continued)

(52) U.S. Cl.
CPC ........... *H04N 25/51* (2023.01); *H04N 25/616* (2023.01); *H04N 25/709* (2023.01); *H04N 25/77* (2023.01); *H04N 25/78* (2023.01)

(58) Field of Classification Search
None
See application file for complete search history.

(56) References Cited

U.S. PATENT DOCUMENTS

2011/0234871 A1   9/2011  Taruki et al.
2022/0417461 A1*  12/2022 Kato ...................... H04N 25/77

FOREIGN PATENT DOCUMENTS

CN       102202186 A    9/2011
CN       108600662 A    9/2018
(Continued)

OTHER PUBLICATIONS

English Translation of International Search Report and Written Opinion for Application No. PCT/CN2023/108311 dated Mar. 18, 2024 (7 pages).

*Primary Examiner* — Mark T Monk
(74) *Attorney, Agent, or Firm* — Merchant & Gould P.C.

(57) ABSTRACT

A control method of a high gain image sensor is provided. A column bias current source and a column PMOS amplifier transistor are provided in a column signal readout unit, the column bias current source is connected to a column-common current output connecting line, a drain of the column PMOS amplifier transistor is connected to a column-common current input connecting line, and a gate of the column PMOS amplifier transistor is connected to the column-common current output connecting line, to acquire an amplified signal of a floating diffusion region of a readout row pixel unit on the column-common current input connecting line. An SHCG is achieved, and a dynamic range in a dark light scene is expanded. A device structure size in the column signal readout unit can be much larger than the (Continued)

transistor in the pixel, which results in better process consistency and more flexible adjustment of the conversion gain.

20 Claims, 14 Drawing Sheets

(51) Int. Cl.
*H04N 25/709* (2023.01)
*H04N 25/77* (2023.01)
*H04N 25/78* (2023.01)

(56) References Cited

FOREIGN PATENT DOCUMENTS

| | | | |
|---|---|---|---|
| CN | 208522868 U | 2/2019 | |
| CN | 111885324 A | 11/2020 | |

* cited by examiner

CONTROL METHOD OF HIGH GAIN IMAGE SENSOR

CROSS-REFERENCE TO RELATED APPLICATION

This application is a National Stage Application of International Patent Application No. PCT/CN2023/108311, filed on Jul. 20, 2023, which claims the benefit of application No. 202310816052.5, filed on 4 Jul. 2023 in China, and which applications are hereby incorporated by reference in their entireties. To the extent appropriate, a claim of priority is made to each of the above disclosed applications.

TECHNICAL FIELD

The present disclosure generally relates to a control method of a high gain image sensor.

BACKGROUND

Standard image sensors have a limited dynamic range of approximately 60 dB to 70 dB. However, a dynamic range of real-world brightness is much larger. Natural scenes generally span a range of 90 dB and above. Image sensors have a capability requirement of single-frame High Dynamic Range (HDR) in certain application scenarios, such as a scenario of capturing moving objects or a scenario of pursuing high frame rate capture readout.

In current CMOS image sensors, a 3T or 4T pixel structure is commonly used (FIG. 1 shows a conventional 4T pixel as an example) for following reasons. An amplifier transistor M3 in the pixel is a Source Follower (SF). The 4T pixel has a relatively large output voltage range, a relatively high degree of freedom in reset voltage, and a conversion gain approximately inversely proportional to capacitance CFD of an FD node (a gate of the amplifier transistor M3). To achieve better noise performance under low illumination, another solution in the industry is to change the amplifier transistor in the pixel to work in a common source amplifier structure, i.e., a Capacitor feedback Transimpedance Amplifier (CTIA) pixel structure (as shown in FIG. 2). This pixel structure has a conversion gain approximately inversely proportional to capacitance $C_{GD}$ between the gate and a drain of the amplifier transistor M3. As $C_{GD}$<<CFD, the CTIA pixel can achieve a higher conversion gain than the traditional 4T pixel. However, the CTIA pixel generally works within a narrow range, and thus a more precise reset voltage is required, which causes poor PVT robustness, and an output voltage to be easily saturated due to charge injection.

To utilize advantages of the above two structures, U.S. Pat. No. 10,277,848B2 proposes a hybrid pixel structure that combines the two structures. By switching a peripheral circuit, the pixel can switch between SF and CTIA modes. Patent No. CN110537366A proposes a differential pixel structure, which improves the problems of a single-ended CTIA pixel to a certain extent. Patent No. CN107770461 proposes a dual-gain output pixel structure, where a signal output of the SF and CTIA modes is realized by combining a pixel and an amplifier in a column circuit.

SUMMARY

Embodiments of the present disclosure provide a control method of a high gain image sensor, which may achieve a higher conversion gain through simple structural improvement and lower power consumption cost based on a traditional pixel structure.

An embodiment of the present disclosure provides a control method of a high gain image sensor, wherein the high gain image sensor includes a plurality of columns of pixel units arranged in an array, each column of pixel units has a column-common current input connecting line and a column-common current output connecting line, a gate of a source follower transistor of each pixel unit in each column is connected to a respective floating diffusion region, a drain of the source follower transistor of each pixel unit in each column is connected to the column-common current input connecting line, and a source of the source follower transistor of each pixel unit in each column is connected to the column-common current output connecting line directly or through respective row selection transistors; the column-common current input connecting line and the column-common current output connecting line are connected to a column signal readout unit; the column signal readout unit includes a column bias current source and a column P-channel Metal-Oxide-Semiconductor (PMOS) amplifier transistor, wherein the column bias current source is connected to the column-common current output connecting line, a drain of the column PMOS amplifier transistor is connected to the column-common current input connecting line, and a gate of the column PMOS amplifier transistor is connected to the column-common current output connecting line directly or through a capacitor, to acquire an amplified signal of a floating diffusion region of a readout row pixel unit on the column-common current input connecting line.

Optionally, in response to the gate of the column PMOS amplifier transistor being connected to the column-common current output connecting line through a first capacitor, a second capacitor is provided between the gate and the drain of the column PMOS amplifier transistor, and a magnification by which the column signal readout unit amplifies the signal of the floating diffusion region of the readout row pixel unit on the column-common current input connecting line is changed by changing a ratio of the first capacitor to the second capacitor.

Optionally, the column signal readout unit further includes a correlation power generation module, through which a first bias voltage is latched and a column second power supply voltage is output to a source of the column PMOS amplifier transistor, to make a power supply of the column signal readout unit has correlation when sampling a reference signal and sampling an image signal, so as to eliminate influence of power supply noise on correlated double sampling.

Optionally, the correlation power generation module includes at least one source follower transistor which has a drain connected to a first power supply voltage, a source connected to an output terminal of the column second power supply voltage, and a gate configured to sample and latch the first bias voltage before the reference signal is sampled, and generate the column second power supply voltage required by the column signal readout unit that has correlation when sampling the reference signal and sampling the image signal.

Optionally, the gate of the source follower transistor of the correlation power generation module samples the first bias voltage through a seventh switch and holds the first bias voltage on a third capacitor, and performs row-by-row or frame-by-frame sampling and holding before the reference signal is sampled.

Optionally, the column signal readout unit further includes a noise compensation module which senses fluctuation of the first power supply voltage or the column second power supply voltage and generates a negative feedback signal to act on the column second power supply voltage to suppress the fluctuation of the column second power supply voltage.

Optionally, the noise compensation module includes a current mirror unit having a bias terminal connected to an output terminal of the first power supply voltage through a fourth capacitor, and a drain connected to the output terminal of the column second power supply voltage.

Optionally, the bias terminal of the current mirror unit samples a second bias voltage through an eighth switch and holds the second bias voltage on a fifth capacitor to perform row-by-row or frame-by-frame sampling and holding.

Optionally, the current mirror unit is a cascode current mirror.

Optionally, the noise compensation module includes an amplifier transistor having a gate connected to the output terminal of the column second power supply voltage through a sixth capacitor, and a drain connected to a current source and to the gate of the source follower transistor of the correlation power generation module through a seventh capacitor, wherein a ninth switch is connected between the gate and the drain of the amplifier transistor, and DC bias of the amplifier transistor is achieved by turning on the ninth switch row by row or frame by frame.

Optionally, the column signal readout unit further includes a clamping module, and before the reference signal is sampled and the image signal is sampled, a voltage of the drain of the source follower transistor of the pixel unit is clamped to a same level by the clamping module respectively.

Optionally, the clamping module includes a clamping transistor having a source connected to the column second power supply voltage, and a gate and a drain connected to each other, wherein the drain is connected to the drain of the source follower transistor of the pixel unit through a tenth switch.

Optionally, a size of the clamping transistor is fixed or array-adjustable.

Optionally, each column signal readout unit corresponds to one correlation power generation module, or a plurality of column signal readout units correspond to one correlation power generation module.

Optionally, each column signal readout unit corresponds to one noise compensation module, or a plurality of column signal readout units correspond to one noise compensation module.

Optionally, each column signal readout unit corresponds to one clamping module, or a plurality of column signal readout units correspond to one clamping module.

Optionally, the method includes: sampling a first reference signal output from the source of the source follower transistor of the pixel unit to the column signal readout unit; sampling a second reference signal output from the drain of the source follower transistor of the pixel unit to the column signal readout unit; and turning on a transfer transistor of the pixel unit, and sampling an image signal output from the pixel unit to the column signal readout unit.

Optionally, said sampling the image signal output from the pixel unit to the column signal readout unit includes: making determination based on a voltage signal read from the pixel unit; in response to determining that it is a high illumination condition, sampling a first image signal output from the source of the source follower transistor of the pixel unit to the column signal readout unit, the pixel unit having a first conversion gain; and in response to determining that it is a low illumination condition, sampling a second image signal output from the drain of the source follower transistor of the pixel unit to the column signal readout unit, the pixel unit having a second conversion gain; wherein the second conversion gain is higher than the first conversion gain.

Optionally, said making determination based on the voltage signal read from the pixel unit includes: comparing a change amplitude of the voltage signal read from the pixel unit before and after the transfer transistor is turned on with a threshold voltage, determining that it is the low illumination condition in response to the change amplitude being less than or equal to the threshold voltage, and determining that it is the high illumination condition in response to the change amplitude being greater than the threshold voltage.

Optionally, a falling interval of a ramp voltage obtained by analog-to-digital conversion is used as the threshold voltage.

Optionally, said sampling the image signal output from the pixel unit to the column signal readout unit includes: sampling a second image signal output from the drain of the source follower transistor of the pixel unit to the column signal readout unit, the pixel unit having a second conversion gain; and sampling a first image signal output from the source of the source follower transistor of the pixel unit to the column signal readout unit, the pixel unit having a first conversion gain; wherein the second conversion gain is higher than the first conversion gain.

Optionally, to output the first image signal from the source of the source follower transistor of the pixel unit to the column signal readout unit, the first conversion gain is adjusted by a dual conversion gain control transistor of the pixel unit.

Optionally, said adjusting the first conversion gain by the dual conversion gain control transistor of the pixel unit includes: turning on the dual conversion gain control transistor to obtain the first conversion gain with a first value, or turning off the dual conversion gain control transistor to obtain the first conversion gain with a second value, wherein the first value is smaller than the second value.

Optionally, outputting the first or second reference signal from the source or drain of the source follower transistor of the pixel unit to the column signal readout unit is controlled by a switch module.

In the embodiments of the present disclosure, an internal structure of the pixel unit of the high gain image sensor is consistent with the traditional 3T or 4T pixel, thereby ensuring process compatibility. By merely improving a circuit structure and a connection method of the column signal readout unit, a Super High Conversion Gain (SHCG) is achieved, and a dynamic range in a dark light scene is expanded without introducing power consumption caused by an additional reference voltage and an additional amplifier circuit. A device structure size in the column signal readout unit can be much larger than the transistor in the pixel, which results in better process consistency and more flexible adjustment of the conversion gain. The switching between the SHCG mode and the STD mode (standard mode, i.e., a traditional source follower mode) can be achieved by driving the switch module in the column signal readout unit without driving the signal in the pixel array, thus, influence on the power supply and ground during operation is smaller, and accordingly stability of the circuit is improved.

Preferably, the first bias voltage is latched by a correlation power generation module and the column second power supply voltage is output to the source of the column PMOS amplifier transistor, to make the power supply of the column signal readout unit has correlation when sampling the reference signal and sampling the image signal, thereby eliminating the influence of power supply noise on the correlated double sampling and improving imaging quality. The noise compensation module senses the fluctuation of the first power supply voltage or the column second power supply voltage and generates a negative feedback signal to act on the column second power supply voltage to suppress the fluctuation of the column second power supply voltage and further reduce the power supply noise. Before the reference signal is sampled and the image signal is sampled, the voltage of the drain of the source follower transistor of the pixel unit is clamped to the same level by a clamping module respectively, thereby accelerating a signal stabilization speed, improving consistency of establishing the reference signal and the image signal, and improving image quality.

BRIEF DESCRIPTION OF THE DRAWINGS

Other features, objects and advantages of the present disclosure will become more apparent from following detailed description of non-limiting embodiments with reference to accompanying drawings.

In the drawings, the same or similar reference numerals denote the same or similar devices (modules) or steps throughout different drawings.

DETAILED DESCRIPTION

To solve the problems in existing techniques, embodiments of the present disclosure provide a control method of a high gain image sensor. A column bias current source and a column PMOS amplifier transistor are provided in a column signal readout unit, the column bias current source is connected to a column-common current output connecting line, a drain of the column PMOS amplifier transistor is connected to a column-common current input connecting line, and a gate of the column PMOS amplifier transistor is connected to the column-common current output connecting line directly or through a capacitor, so that an amplified signal of a floating diffusion region of a readout row pixel unit can be acquired on the column-common current input connecting line.

In following specific description of preferred embodiments, reference will be made to accompanying drawings which constitute a part of the present disclosure. The accompanying drawings show by way of example specific embodiments that can implement the present disclosure. The illustrative embodiments are not intended to be exhaustive in enumerating all embodiments of the present disclosure. It could be understood that other embodiments may be utilized, and structural or logical modifications may also be made without departing from the scope of the present disclosure. Therefore, the following specific description is not restrictive, and the scope of the present disclosure is limited by appended claims.

Detailed description is provided below with reference to specific embodiments.

Figure 1:
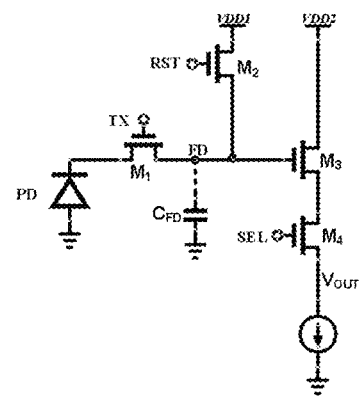
FIG. 1 is a circuit diagram of an image sensor with a 4T pixel structure in existing techniques.
Figure 2:
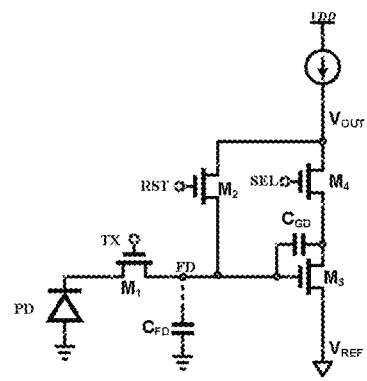
FIG. 2 is a circuit diagram of an image sensor with a CTIA pixel structure in the existing techniques.
Figure 3:
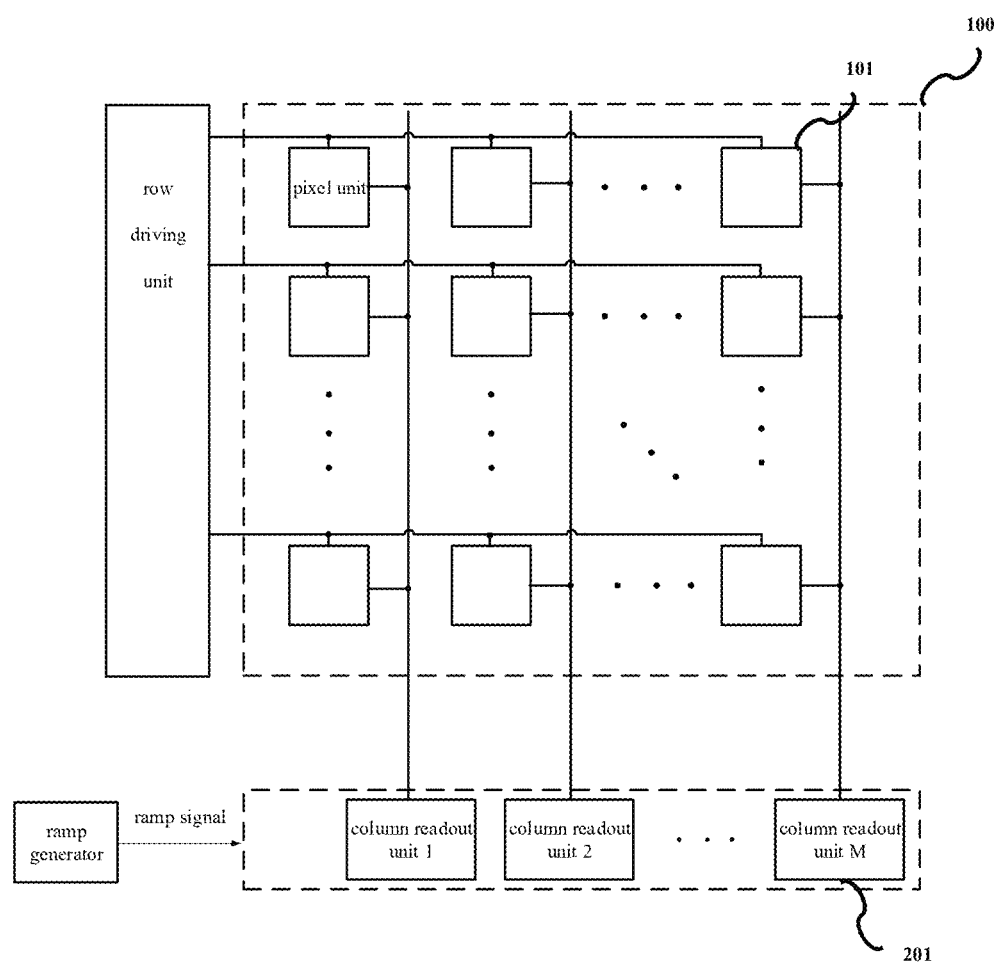
FIG. 3 is a system schematic diagram of a high gain image sensor according to an embodiment.
Figure 4:
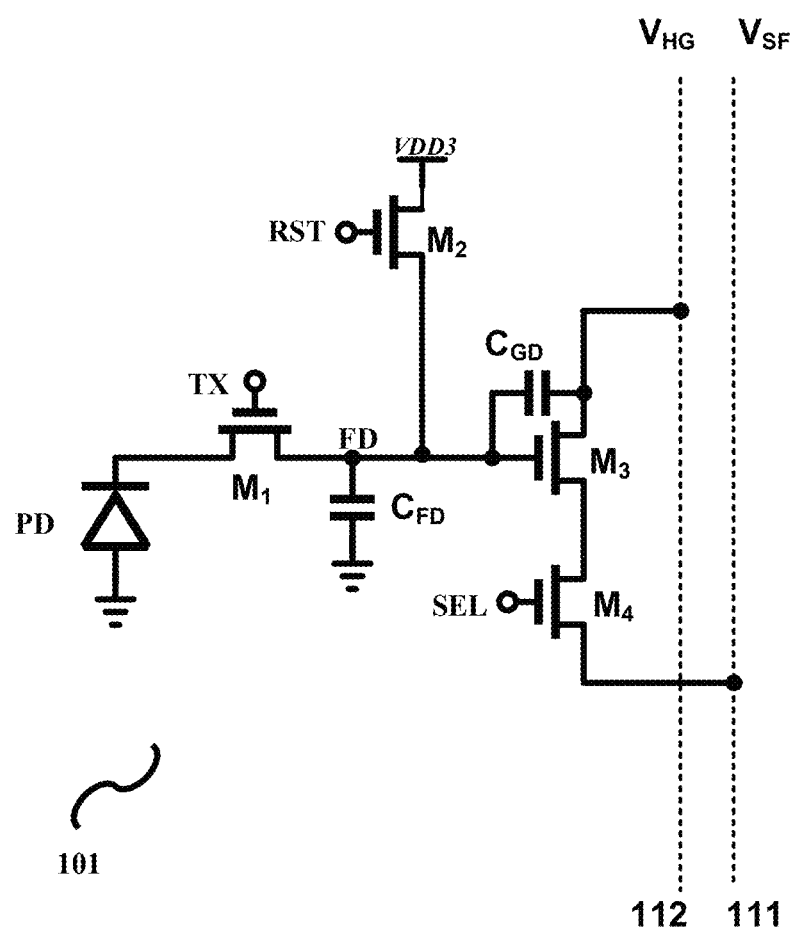
FIG. 4 is a circuit diagram of a 4T pixel unit in a high gain image sensor according to an embodiment.
Figure 5:
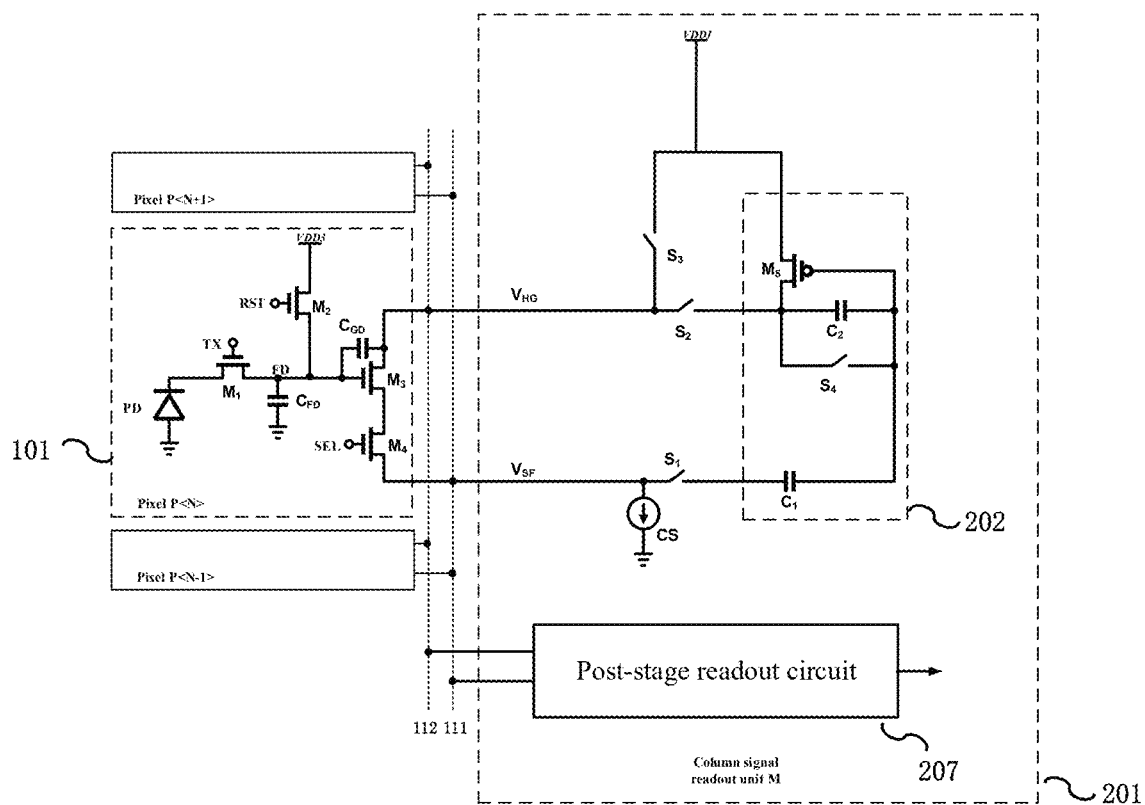
FIG. 5 is a circuit diagram of a high gain image sensor according to an embodiment.

As shown in FIGS. 3, 4 and 5, the high gain image sensor according to an embodiment of the present disclosure includes a plurality of columns of pixel units 101 arranged in an array and a plurality of column signal readout units 201. Each column signal readout unit 201 corresponds to one or more columns of pixel units 101 in the pixel array 100, and is configured to read an output voltage signal from the corresponding column of pixel units 101 (FIG. 5 shows a specific circuit of a pixel unit P <N> in the Mth column of pixel units and its corresponding column signal readout unit M as an example).

Specifically, each pixel unit 101 includes a photodiode PD and a plurality of pixel transistors including a transfer transistor M1, a reset transistor M2, a source follower transistor M3, and a row selection transistor M4. The photodiode PD is configured to perform photoelectric conversion on incident light to acquire corresponding charges, the transfer transistor M1 is configured to transfer charges accumulated in the photodiode PD to the floating diffusion region FD, the reset transistor M2 is configured to reset a potential of the floating diffusion region FD, the source follower transistor M3 is configured to convert charges of the floating diffusion region FD into corresponding voltage signals, and the row selection transistor M4 is configured to output the voltage signal to the corresponding column signal readout unit 201.

Each column of pixel units 101 has a column-common current input connecting line 112 and a column-common current output connecting line 111. A gate of the source follower transistor M3 of each pixel unit 101 in each column is connected to the floating diffusion region FD of the pixel unit 101, a drain of the source follower transistor M3 is connected to the column-common current input connecting line 112, and a source of the source follower transistor M3 is connected to the column-common current output connecting line 111 through the row selection transistor M4 of the pixel unit 101. It should be noted that, in the 4T pixel structure shown in FIGS. 4 and 5, the row selection transistor M4 is connected between the source of the source follower transistor M3 and the column-common current output connecting line 111. In other embodiments for 4T pixel structure, the row selection transistor M4 may be connected between the drain of the source follower transistor M3 and the column-common current input connecting line 112. In other embodiments for 3T pixel structure, the row selection transistor M4 may be omitted. That is, the source of the source follower transistor M3 may be directly connected to the column-common current output connecting line 111.

The column-common current input connecting line 112 and the column-common current output connecting line 111 are connected to the corresponding column signal readout unit 201 that includes a column bias current source CS and a column PMOS amplifier transistor M5. Here, one column PMOS amplifier transistor M5 is shown as an example. It could be understood by those skilled in the art that in other embodiments not shown, there may be a plurality of column PMOS amplifier transistors M5. The column bias current source CS is connected to the column-common current output connecting line 111, a drain of the column PMOS amplifier transistor M5 is connected to the column-common current input connecting line 112, and a gate of the column PMOS amplifier transistor M5 is connected to the column-common current output connecting line 111. With such a structure, an amplified signal of a floating diffusion region of a readout row pixel unit can be acquired on the column-common current input connecting line 112. In addition, a source of the column PMOS transistor M5 is connected to a first power supply voltage VDD1, which provides a power supply voltage for the column PMOS transistor M5. Adopting the column PMOS amplifier transistor M5 to amplify the signal of the floating diffusion region of the readout row pixel unit has the advantages of simple structure, low noise, large voltage margin and the like.

Preferably, when the gate of the column PMOS amplifier transistor M5 is connected to the column-common current output connecting line 111 through a first capacitor C1, a second capacitor C2 is provided between the gate and the drain of the column PMOS amplifier transistor M5. Specifically, the column-common current output connecting line 111 is connected to a first terminal of the first capacitor C1, a second terminal of the first capacitor C1 is connected to a first terminal of the second capacitor C2 and the gate of the column PMOS amplifier transistor M5, and a second terminal of the second capacitor C2 and the drain of the column PMOS amplifier transistor M5 are connected to the column-common current input connecting line 112. The second capacitor C2 may be a parasitic capacitor of the column PMOS amplifier transistor M5, or may be an independent capacitor like the first capacitor C1. The first capacitor C1 and the second capacitor C2 may be fixed capacitors, or variable capacitor arrays, so that a magnification by which the column signal readout unit 201 amplifies a signal of the floating diffusion region of the readout row pixel unit on the column-common current input connecting line 112 is changed by changing a ratio of the first capacitor C1 to the second capacitor C2, thereby flexibly adjusting a conversion gain of the pixel unit. Preferably, the column signal readout unit 201 further includes a first switch S4 connected in parallel with the second capacitor C2, which is configured to perform a self-clearing operation on the column PMOS amplifier transistor M5.

Based on the above structure, the column signal readout unit 201 is capable of reading a voltage signal VHG from the drain of the source follower transistor M3. The first capacitor C1, the second capacitor C2, transconductance Gm of the column PMOS amplifier M5 and a load provide a gain from the floating diffusion region FD to the output node VHG, thereby acquiring a conversion gain higher than the standard mode (STD mode, i.e., the traditional source follower mode), which, thus, can be called a Super High Conversion Gain (SHCG) mode. As the first capacitor C1, the second capacitor C2, and the column PMOS amplifier transistor M5 are all disposed in a peripheral circuit, their size can be much larger than the transistor M3 in the pixel. Compared with the traditional CTIA pixel structure, process consistency is better, and the conversion gain can be adjusted more flexibly.

Further preferably, the source or drain of the source follower transistor M3 of the pixel unit 101 may be controlled by the switch module to output to the column signal readout unit 201, so as to realize the switching between the SHCG mode and the STD mode. Specifically, the column signal readout unit 201 further includes a first switch S1, a second switch S2, and a third switch S3. The column-common current output connecting line 111 is connected to the first terminal of the first capacitor C1 through the first switch S1, the second terminal of the second capacitor C2 and the drain of the column PMOS amplifier transistor M5 are connected to the column-common current input connecting line 112 through the second switch S2, and the column-common current input connecting line 112 is connected to the first power supply voltage VDD1 through the third switch S3.

Figure 6:
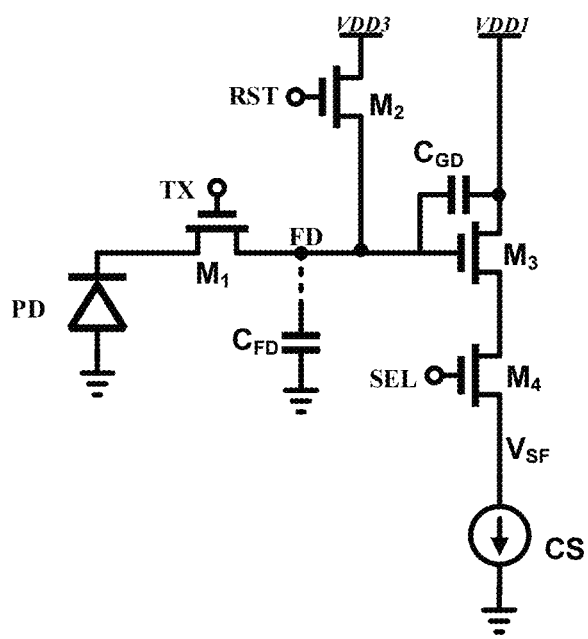
FIG. 6 is an equivalent circuit diagram of the high gain image sensor of FIG. 5 in an STD mode.
Figure 7:
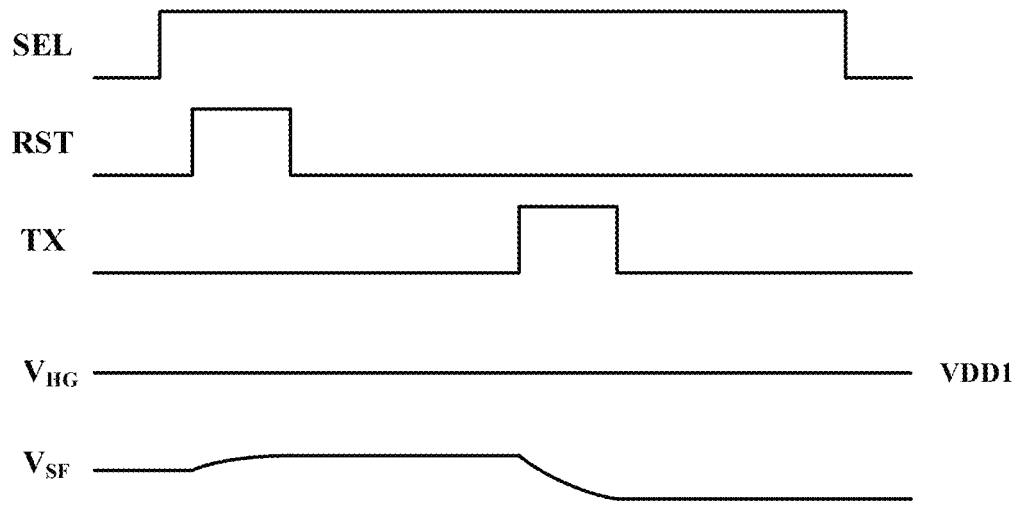
FIG. 7 is a signal timing diagram of the high gain image sensor of FIG. 5 in the STD mode.

Therefore, when the third switch S3 is turned on, and the first switch S1 and the second switch S2 are turned off, an equivalent circuit of the image sensor operating in the STD mode is shown in FIG. 6, and a signal timing is shown in FIG. 7. In this mode, a post-stage readout circuit 207 reads a first voltage signal VSF from the source of the source follower transistor M3, which is equivalent to the traditional source follower mode. In this case, a first conversion gain CG1 is relatively low as following, $$CG1 = \frac{e^-}{C_{FD} + C_{GD}}. \quad \text{(Formula 1)}$$

Figure 8:
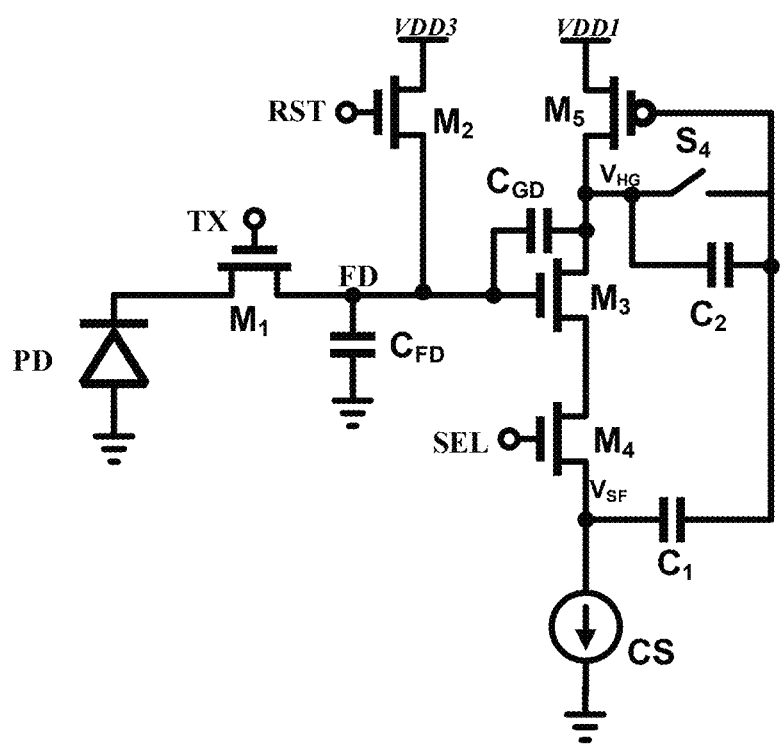
FIG. 8 is an equivalent circuit diagram of the high gain image sensor of FIG. 5 in an SHCG mode.
Figure 9:
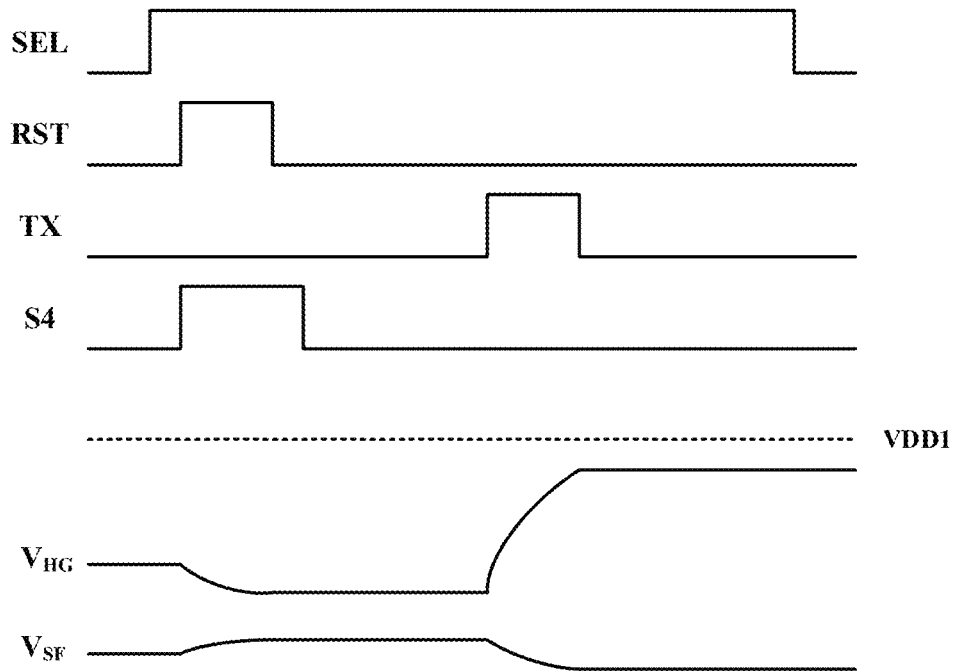
FIG. 9 is a signal timing diagram of the high gain image sensor of FIG. 5 in the SHCG mode.

When the third switch S3 is turned off, and the first switch S1 and the second switch S2 are turned on, an equivalent circuit of the image sensor operating in the SHCG mode is shown in FIG. 8, and the signal timing is shown in FIG. 9. In this mode, the post-stage readout circuit 207 reads a second voltage signal VHG from the drain of the source follower transistor M3, and a second conversion gain CG2 in this case is relatively high as following, $$CG2 \approx \frac{e^-}{\frac{1}{A_v}C_{FD} + \left(1 + \frac{1}{A_v}\right)C_{GD}}.\quad\text{(Formula 2)}$$

Figure 10:
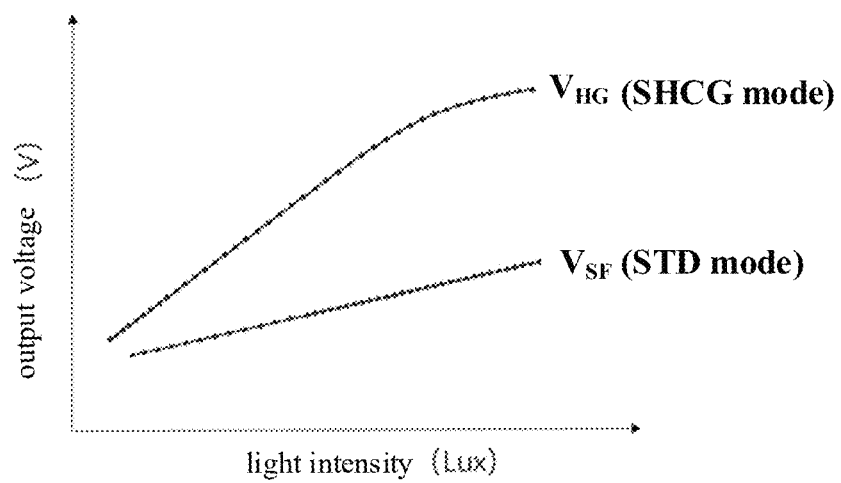
FIG. 10 is a conversion gain curve diagram of the high gain image sensor of FIG. 5 in two modes.

Conversion gain curves in the two modes are shown in FIG. 10.

Figure 11:
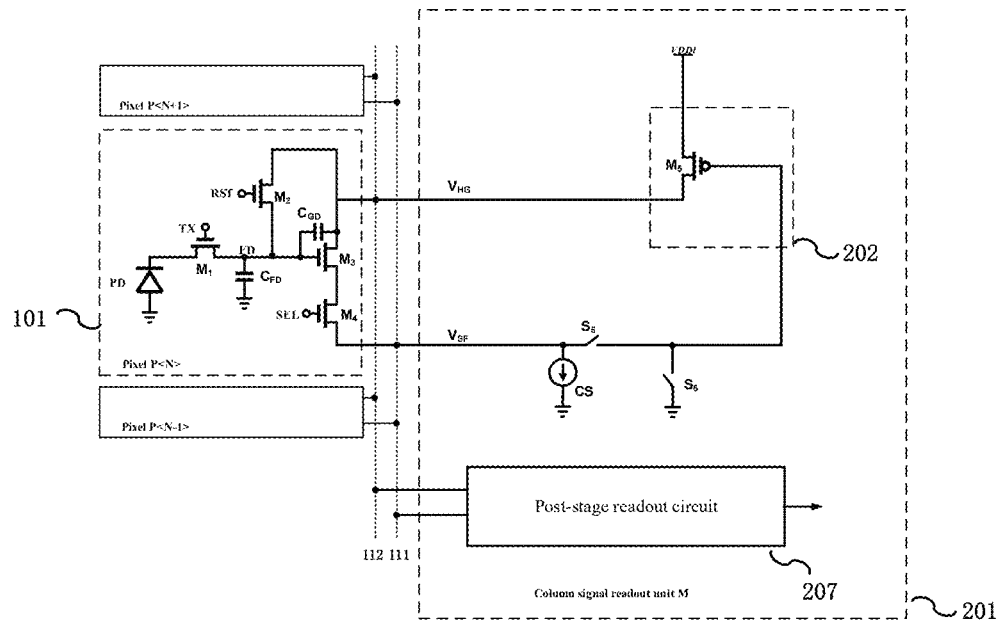
FIG. 11 is a circuit diagram of a high gain image sensor according to an embodiment.

As shown in FIG. 11, in another preferred embodiment of the image sensor, the first capacitor C1, the second capacitor C2, and the fourth switch S4 may be omitted, that is, the gate of the column PMOS amplifier transistor M5 is directly connected to the column-common current output connecting line 111. It should be noted that when such a structure omitting the capacitor is adopted, in the pixel unit 101, a drain of the reset transistor M2 should be connected to the drain of the source follower transistor M3 accordingly (different from the above embodiment where a drain of the reset transistor M2 is connected to a third power supply voltage VDD3), so as to realize self-clearing through the pixel unit.

Further preferably, the column signal readout unit 201 further includes a fifth switch S5 and a sixth switch S6, the column-common current output connecting line 111 is connected to the gate of the column PMOS amplifier transistor M5 through the fifth switch S5, and the gate of the column PMOS amplifier transistor M5 is also connected to a ground voltage through the sixth switch S6.

Therefore, when the sixth switch S6 is turned on and the fifth switch S5 is turned off, the column PMOS amplifier transistor M5 is turned on as a switch, the image sensor operates in the STD mode, and the post-stage readout circuit 207 reads the first voltage signal VSF from the source of the source follower transistor M3, which is equivalent to the traditional source follower mode. In this case, the first conversion gain CG1 is relatively low.

When the sixth switch S6 is turned off and the fifth switch S5 is turned on, the column PMOS amplifier transistor M5 serves as an amplifier unit, the image sensor operates in the SHCG mode, and the post-stage readout circuit 207 reads the second voltage signal VHG from the drain of the source follower transistor M3. In this case, the second conversion gain CG2 is relatively high.

In addition, existing variable conversion gain image sensors always adopt a Dual Conversion Gain (DCG) design. This design introduces an external capacitor and an additional control switch, such as a Metal Oxide Semiconductor Field Effect Transistor (MOSFET). When a higher signal strength needs to be read, the control switch is turned on to connect the FD to a capacitor to help extract charges, where the conversion gain is relatively low (the LCG mode). When a lower signal strength needs to be read, the control switch is turned off, where a higher conversion gain (the HCG mode) is acquired and a readout signal-to-noise ratio is increased. This solution performs well in existing pixel designs and may effectively expand a dynamic range without changing design of the PD.

A readout operation of an existing row-controlled Dual Conversion Gain (r ow-DCG) image sensor includes four stages: sampling an LCG reference signal, sampling an HCG reference signal, sampling an HCG image signal, and sampling an LCG image signal (i.e. LCG ref, HCG ref, HCG sig, and LCG sig). Image signals output by the pixel unit under two conversion gains need to be quantized and saved respectively, which is not conducive to high-speed operation. In a readout operation of an existing column-controlled Dual Conversion Gain (col-DCG) image sensor, each column readout circuit adjusts a conversion gain of the pixel unit according to a bit line voltage. However, as a control signal of each column of pixel units is shared, a column control circuit is overloaded, which causes a problem of excessive impact on power supply when the control signal is flipped.

The high gain image sensor of the present disclosure can be multiplexed with the traditional DCG solution. For example, in an extremely dark scene, a drain output of the source follower transistor M3 is adopted (the SHCG mode, the second conversion gain CG2), and in a relatively dark or a relatively bright scene, a source output of the source follower transistor M3 is adopted (the STD mode, the first conversion gain CG1). In the STD mode, the row control circuit further adjusts the first conversion gain CG1 by turning on or off the DCG transistor according to an application scenario. Specifically, by turning on the DCG transistor to obtain a relatively low first conversion gain (Low-CG1), or turning off the DCG transistor to obtain a relatively high first conversion gain (High-CG1), a relatively high HCG or a relatively low LCG readout mode is selected to further expand the dynamic range.

How to utilize the control method of the high gain image sensor provided in the present disclosure to achieve specific advantages is described in detail below on the basis of a circuit structure of FIG. 12. The advantages include achieving a high dynamic range by adjusting the conversion gain of the pixel unit, reducing the impact of the switching operation, improving the circuit stability, and improving the reading efficiency.

The floating diffusion region FD is connected to a DCG control transistor M0. Equivalent capacitance of the FD point is different when the DCG control transistor M0 is turned on or turned off. When M0 is turned on, the capacitance of FD increases, and more electrons can be collected from the PD transistor to expand the dynamic range. Connection methods of other transistors are all existing technologies, and are not repeated. The third switch S3 is controlled by a signal SHCG_ENB, and the first switch S1 and the second switch S2 are controlled by a signal SHCG_EN. A high level represents that the switch is turned on, and a low level represents that the switch is turned off. The signals SHCG_EN and SHCG_ENB are reverse digital control signals, and automatically output by a post-stage readout circuit 207 based on an input signal.

Figure 12:
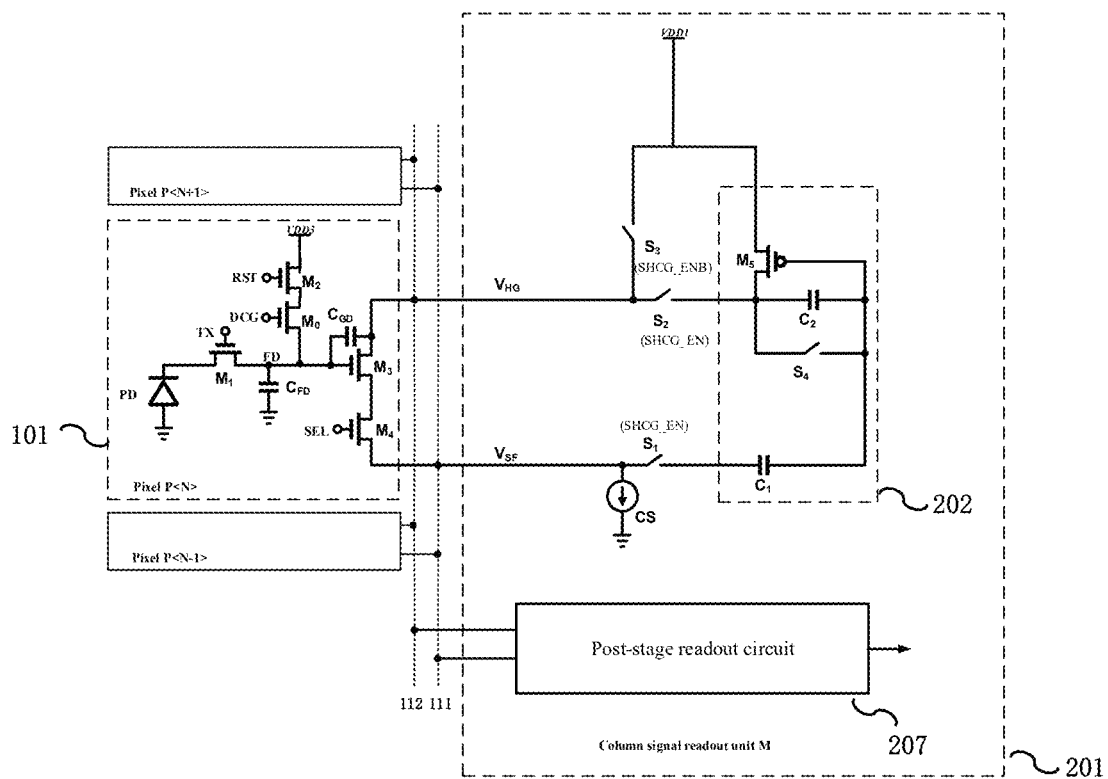
FIG. 12 is a circuit diagram of a high gain image sensor according to an embodiment.
Figure 13:
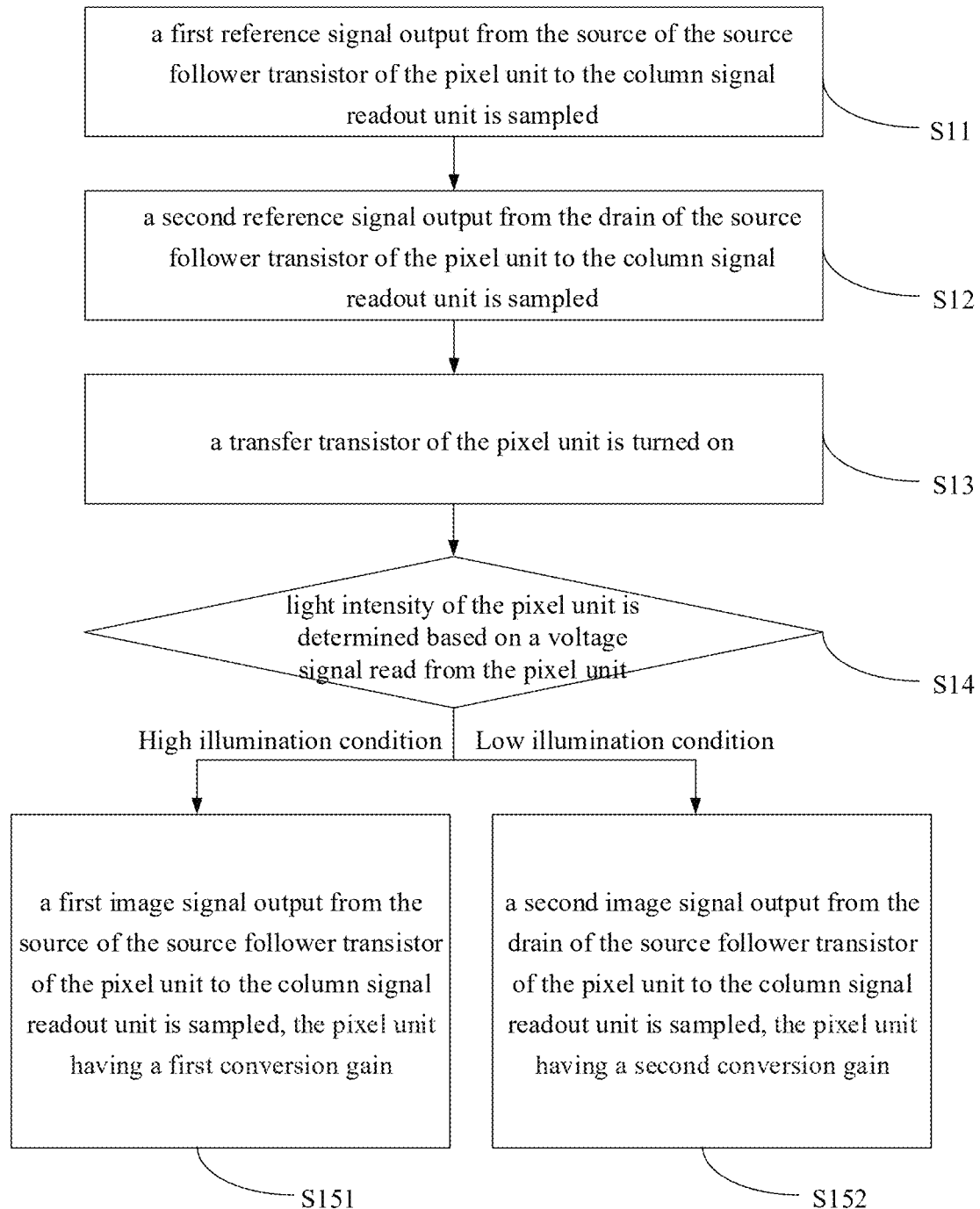
FIG. 13 is a flow chart of a control method of the high gain image sensor of FIG. 12.

FIG. 13 is a flow chart of a control method of the high gain image sensor of FIG. 12.

In S11, a first reference signal output from the source of the source follower transistor of the pixel unit to the column signal readout unit is sampled.

In S12, a second reference signal output from the drain of the source follower transistor of the pixel unit to the column signal readout unit is sampled.

In S13, a transfer transistor of the pixel unit is turned on.

In S14, light intensity (i.e., illumination condition) of the pixel unit is determined based on a voltage signal read from the pixel unit.

In S15, an image signal output by the pixel unit to the column signal readout unit is sampled based on the determination result (In S151, in response to determining that it is a high illumination condition, a first image signal output from the source of the source follower transistor of the pixel unit to the column signal readout unit is sampled. Or in S152, in response to determining that it is a low illumination condition, a second image signal output from the drain of the source follower transistor of the pixel unit to the column signal readout unit is sampled).

Figure 14:
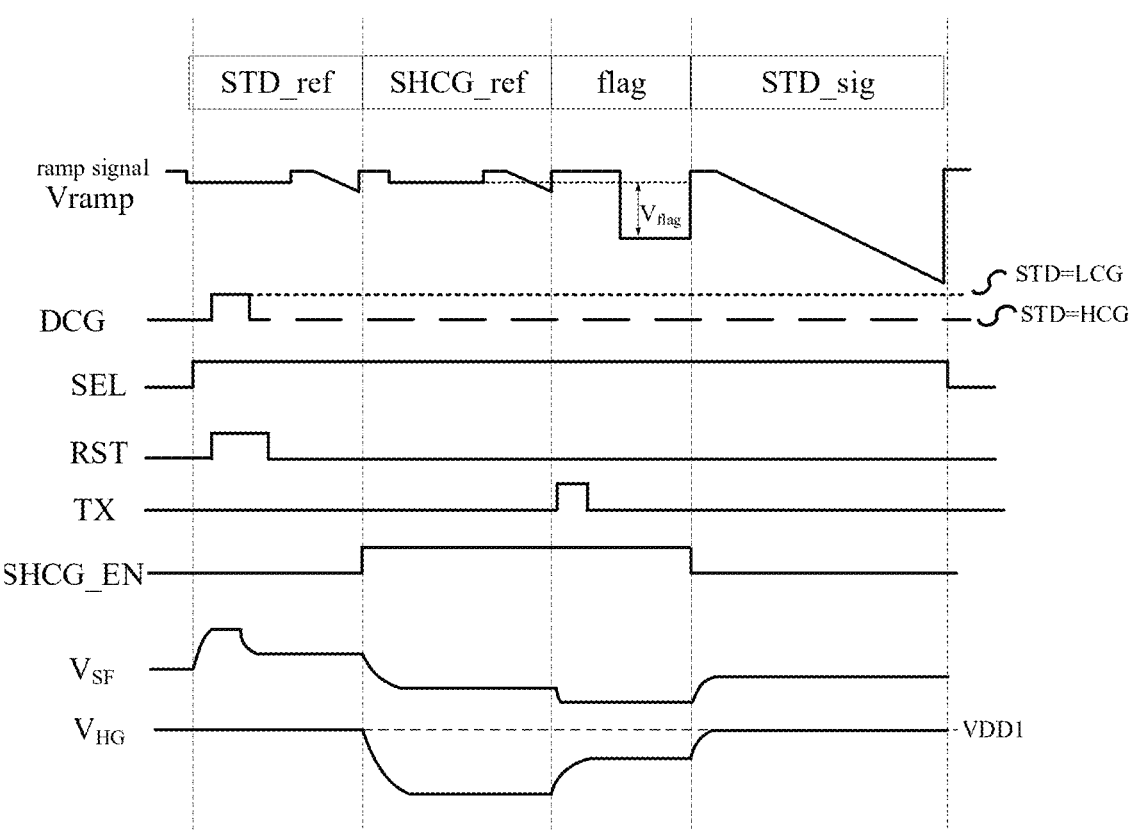
FIG. 14 is a signal timing diagram of the control method of FIG. 13 in a high illumination condition.

Specifically, FIG. 14 is a signal timing diagram of the control method of FIG. 13 in the high illumination condition, which includes four stages.

(1) STD_Ref Stage

The SHCG_EN signal is at a low level, the third switch S3 is turned on, and the first switch S1 and the second switch S2 are turned off. In this case, the column PMOS amplifier transistor M5 is not connected to the pixel circuit, a VHG voltage is connected to the first power supply voltage VDD1 through the third switch S3, and the column signal readout unit 201 is in the STD mode. In this mode, an output node of the pixel unit 101 is the source of the source follower transistor M3, and the voltage VSF is a valid signal input to the post-stage readout circuit 207. In the pixel unit 101, SEL becomes high level to select this row, and the DCG and RST signals are high level as well, and the FD point in the pixel unit 101 is reset. Afterward, the RST signal becomes low level, and DCG has two states, maintaining high level or becoming low level, which respectively represent that the STD mode can support the LCG mode or the HCG mode, so that the dynamic range can be selected more flexibly. The post-stage readout circuit 207 quantizes a VSF voltage to read STD_ref reset information, that is, completing the step of sampling the first reference signal STD_ref output from the source of the source follower transistor M3 of the pixel unit 101 to the column signal readout unit 201.

(2) SHCG_Ref Stage

The SHCG_EN signal becomes high level, the third switch S3 is turned off, and the first switch S1 and the second switch S2 are turned on. In this case, the column PMOS amplifier transistor M5 is connected to the pixel circuit to form a closed loop, and the VSF voltage is disconnected from the post-stage readout circuit 207, and the column signal readout unit 201 is in the SHCG mode. In this mode, the output node of the pixel unit 101 is the drain of the source follower transistor M3, and the voltage VHG is a valid signal input to the post-stage readout circuit 207. As the column PMOS amplifier transistor M5 has a negative gain-AV, the Miller effect allows most of electrons flowing out of the PD transistor in the pixel unit 101 to flow to a capacitor CGD, thereby acquiring a higher conversion gain than that in the STD mode. The post-stage readout circuit 207 quantizes the VHG voltage to read SHCG_ref reset information, that is, completing the step of sampling the second reference signal SHCG_ref output from the drain of the source follower transistor M3 of the pixel unit 101 to the column signal readout unit 201.

(3) Flag Judgment Stage

The circuit is still in the SHCG mode, a TX signal in the pixel unit 101 becomes high level, electrons in the PD transistor flow out through the turned-on transfer transistor M1, and the VHG signal generates a corresponding voltage according to a number of the electrons.

Afterward, determination is made based on the voltage signal read from the pixel unit. A reference threshold voltage Vflag is required to determine light intensity. The Vflag voltage may be designed to be adjustable to achieve best effect of images. In the embodiment, a falling interval of a ramp voltage (Vramp) of analog-to-digital conversion is adopted as the reference threshold voltage Vflag. In other embodiments not shown, a new threshold voltage may be adopted. A change amplitude of the voltage signal VHG read from the pixel unit 101 before and after the transfer transistor M1 is turned on is compared with the threshold voltage Vflag. If the change amplitude of VHG is less than or equal to the threshold voltage Vflag, it is a low illumination condition. If the change amplitude of VHG is greater than the threshold voltage Vflag, it is a high illumination condition.

Taking the determination result of high illumination condition as an example, a relatively low conversion gain may be selected, and then an STD sig stage is entered.

(4) STD_Sig Stage

The SHCG_EN signal becomes low level, the circuit switches to the STD mode, the VHG signal is connected to VDD1, and the post-stage readout circuit 207 quantizes the VSF signal to read out image information related to the light intensity, that is, sampling a first image signal STD_sig output from the source of the source follower transistor M4 of the pixel unit to the column signal readout unit 201. Based on the first image signal STD_sig and the first reference signal STD_ref, the pixel unit 101 has a first conversion gain CG1.

Figure 15:
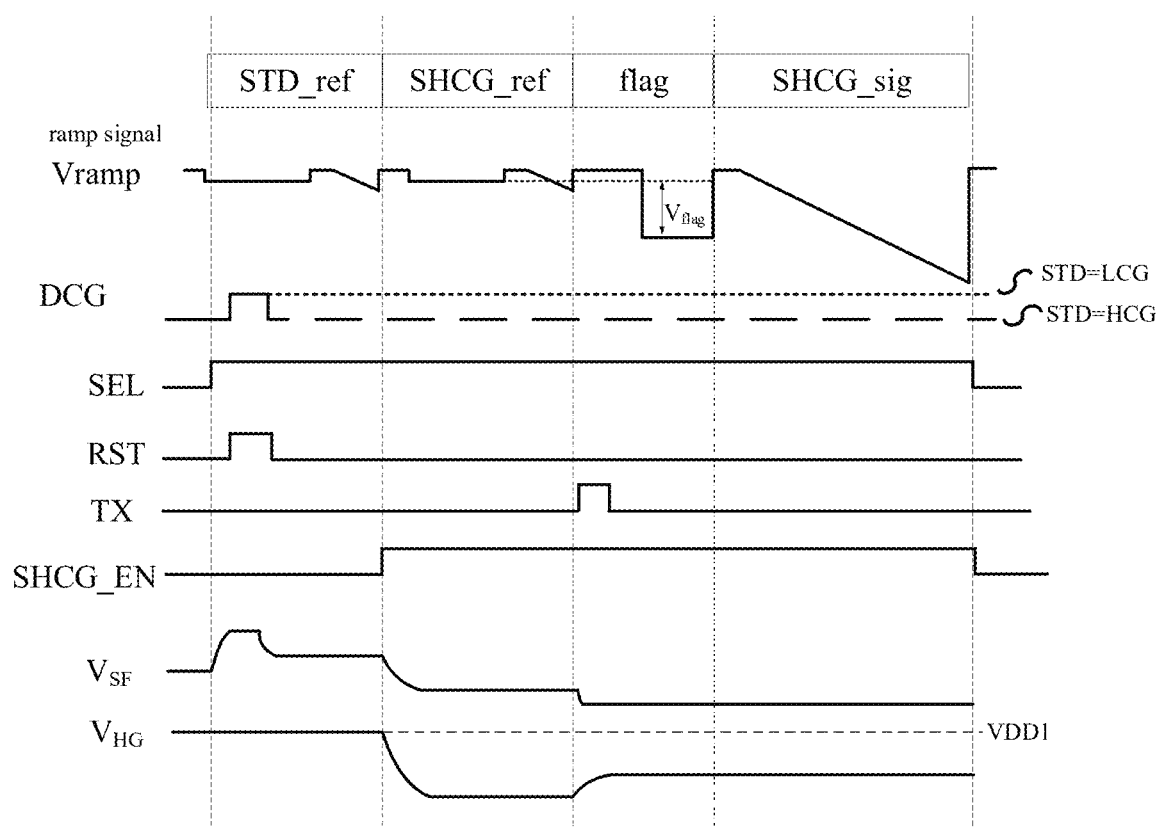
FIG. 15 is a signal timing diagram of the control method of FIG. 13 in a low illumination condition.
Figure 16:
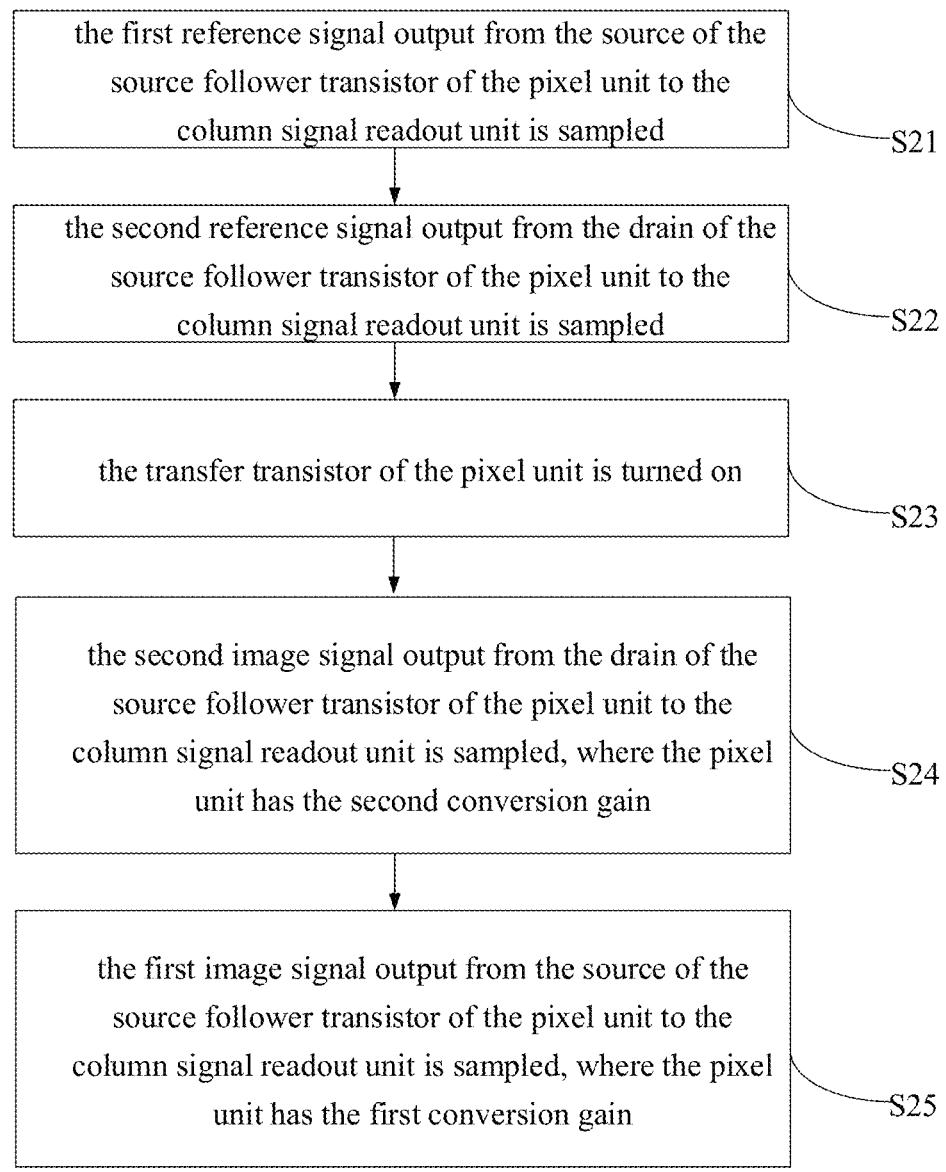
FIG. 16 is another flow chart of a control method of the high gain image sensor of FIG. 12.

FIG. 15 is a signal timing diagram of the control method of FIG. 13 in the low illumination condition, which also includes four stages, where the first two stages are the same as those in FIG. 14, and the difference lies in the last two stages.

(3) Flag Judgment Stage

The circuit is still in the SHCG mode, the TX signal in the pixel unit 101 becomes high level, the electrons in the PD transistor flow out through the turned-on transfer transistor M1, and the VHG signal generates a corresponding voltage according to the number of the electrons.

Afterward, determination is made based on the voltage signal read from the pixel unit. The falling interval of the ramp voltage (Vramp) of analog-to-digital conversion is adopted as the threshold voltage Vflag, and the change amplitude of the voltage signal VHG read from the pixel unit 101 before and after the transfer transistor M1 is turned on is compared with the threshold voltage Vflag. If the change amplitude of VHG is less than or equal to the threshold voltage Vflag, the determination result is the low illumination condition, and a higher conversion gain is required to obtain better image quality, thus, an SHCG_sig stage is entered.

(4) SHCG_Sig Stage

The SHCG_EN signal maintains high level, the circuit is still in the SHCG mode, and the post-stage readout circuit 207 quantizes the VHG signal to read out image information related to the light intensity, that is, sampling a second image signal SHCG_sig output from the drain of the source follower transistor M3 of the pixel unit to the column signal readout unit 201. Based on the second image signal SHCG_sig and the second reference signal SHCG_ref, the pixel unit 101 has a second conversion gain CG2 that is greater than the first conversion gain CG1.

As shown in FIGS. 13 to 15, in the above embodiments, the first reference signal STD_ref output from the source of the source follower transistor of the pixel unit to the column signal readout unit and the second reference signal SHCG_ref output from the drain of the source follower transistor to the column signal readout unit are sampled respectively, and then the light intensity of the pixel unit is determined based on the voltage signal read from the pixel unit, so that an appropriate readout architecture is automatically selected to sample the second image signal SHCG_sig output from the drain of the source follower transistor or the first image signal STD_sig output from the source of the source follower transistor, thereby adaptively adjusting the conversion gain of the image sensor and realizing a high dynamic range. Especially, the SHCG readout mode of outputting from the drain of the source follower transistor can expand the dynamic range in the dark light scene, and it is unnecessary to drive the signal in the pixel array when adjusting the conversion gain of the pixel unit, but only to drive the switch module in the column signal readout unit, which reduces influence on the power supply and ground during the switching operation, and thus improves stability of the circuit. In addition, in a reading period of each pixel unit, it is merely necessary to read the reference signal ref twice and read the image signal sig once, which is conducive to improving reading efficiency and generating HDR images at a higher frame rate.

Figure 17:
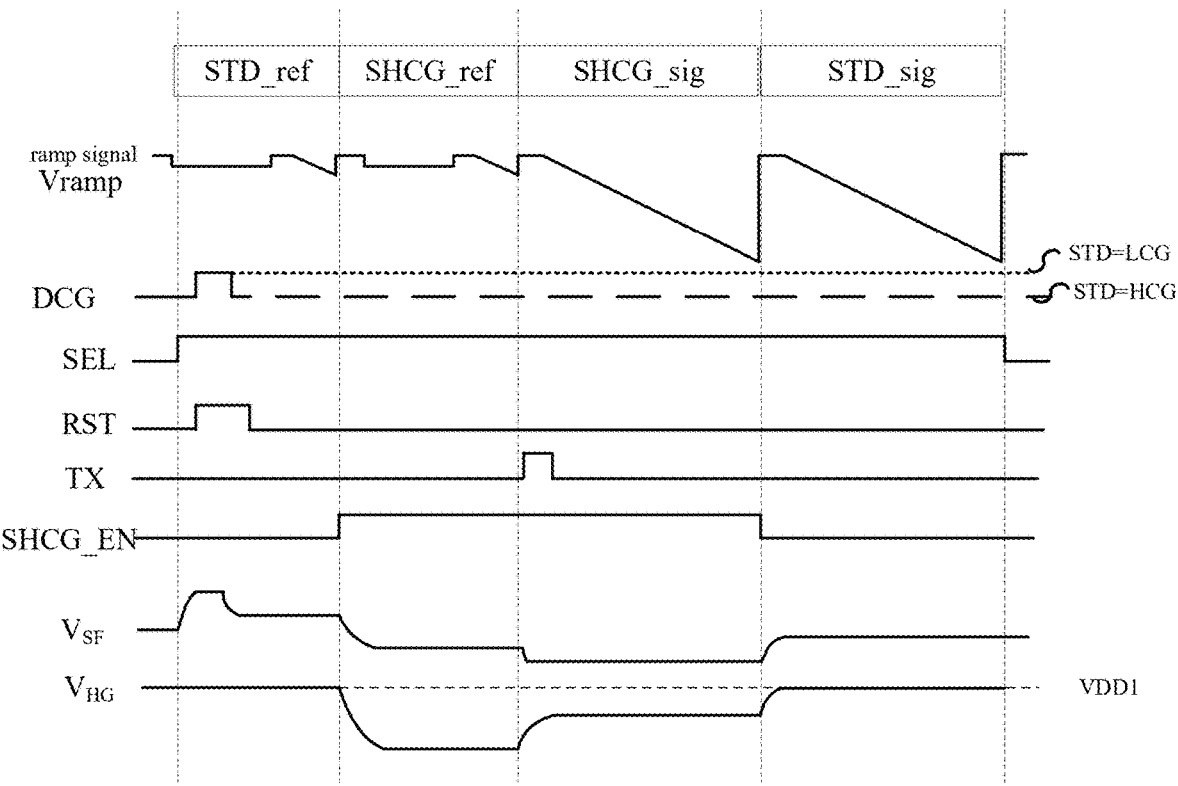
FIG. 17 is a signal timing diagram of the control method of FIG. 16.

The SHCG_EN signal of the high gain image sensor of the present disclosure may be switched to global control of column circuit, and then read out in conjunction with a row control signal, which supports the readout timing as shown in FIG. 17, and sequentially performs four processes of STD ref, SHCG ref, SHCG sig, and STD sig to generate an HDR image. As shown in FIG. 15, another process of the conversion gain control method of the high gain image sensor of the present disclosure includes S21 to S25.

In S21, the first reference signal output from the source of the source follower transistor of the pixel unit to the column signal readout unit is sampled (STD_ref stage).

In S22, the second reference signal output from the drain of the source follower transistor of the pixel unit to the column signal readout unit is sampled (SHCG_ref stage).

In S23, the transfer transistor of the pixel unit is turned on.

In S24, the second image signal output from the drain of the source follower transistor of the pixel unit to the column signal readout unit is sampled, where the pixel unit has the second conversion gain (SHCG_sig stage).

In S25, the first image signal output from the source of the source follower transistor of the pixel unit to the column signal readout unit is sampled, where the pixel unit has the first conversion gain that is lower than the second conversion gain (STD_sig stage).

A circuit principle and a switching process of each stage are similar to those in the above-mentioned embodiments, and are not described in detail here.

It should be noted that specific circuits and signal timings of the various embodiments of the present disclosure are only taken as examples. One skilled in the art can make other modifications or have other implementation methods based on common knowledge in the field. For example, the source or drain of the source follower transistor of the pixel unit can be controlled to output to the column signal readout unit through other forms of switch modules. The first reference signal output from the source of the source follower transistor of the pixel unit to the column signal readout unit and the second reference signal output from the drain of the source follower transistor to the column signal readout unit are sampled respectively, and then the image signal output from the pixel unit to the column signal readout unit is sampled according to requirements, so as to achieve a high dynamic range by adjusting the conversion gain of the pixel unit, which can be applied to achieve the purpose of the present disclosure and should be included in the scope of the present disclosure.

As the column PMOS amplifier transistor M5 is introduced in the column signal readout unit, it is more dependent on a low-noise analog power supply. In actual image sensors, a column readout circuit structure is adopted and an analog power supply VDD1 is shared. However, in a quantization process, image signals of each column have inconsistent sizes, different flip points, different dynamic currents, and different time and amplitude of the impact on the power supply. Fluctuations caused by the impact on the power supply may in turn affect the quantization of the image signals of each column. In addition, noise of the power supply input may also be coupled into the readout circuit, thereby affecting the quantization result of the correlated double sampling, and resulting in various image anomalies such as horizontal stripes and tailing.

In addition, as output impedance of VHG in the SHCG mode is greater than output impedance of VSF in the STD mode, a VHG signal may be established with a relatively long time, which may affect a readout frame rate and image quality of the image sensor. Before a ref signal is read, switching operation of the switch S4 causes fluctuation of a gate voltage of the column PMOS amplifier transistor M5 due to channel charge injection effect and clock feedthrough effect, thereby causing fluctuation of a VHG voltage on the column-common current input connecting line 112. Before a sig signal is read, switching operation of the transfer transistor M1 in the pixel also causes fluctuation of a voltage of the FD point in the pixel, thereby causing fluctuation of the VHG voltage.

Figure 18:
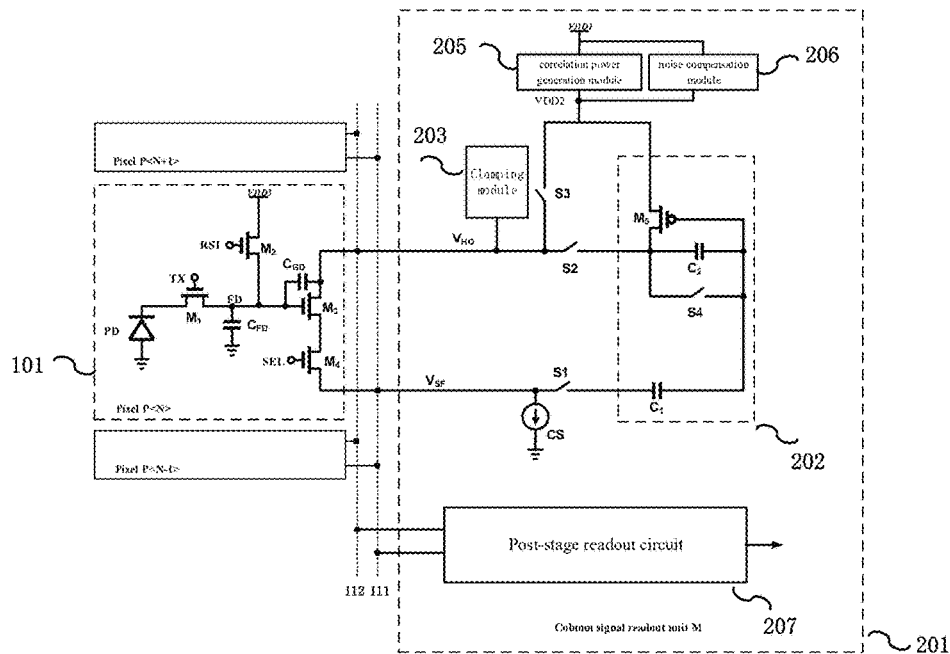
FIG. 18 is a circuit diagram of a high gain image sensor according to an embodiment.

To further solve above problems, referring to another preferred embodiment shown in FIG. 18, inventors of the present disclosure have found through research that, a correlation power generation module 205 may be added to the column signal readout unit 201, a first bias voltage Vbias is latched by the correlation power generation module 205, and a column second power supply voltage VDD2 is output to the column PMOS amplifier transistor M5, to make the power supply of the column PMOS amplifier transistor M5 has correlation when sampling the reference signal and sampling the image signal, thereby eliminating influence of power supply noise on the correlated double sampling and improving the imaging quality.

Preferably, a noise compensation module 206 may be added to the column signal readout unit 201. The noise compensation module 206 senses fluctuation of the first power supply voltage VDD1 or the column second power supply voltage VDD2 and generates a negative feedback signal to act on the column second power supply voltage VDD2, so as to suppress the fluctuation of the column second power supply voltage VDD2 and further reduce the power supply noise;

Preferably, a clamping module 203 may be added to the column signal readout unit 201. Before the reference signal is sampled and the image signal is sampled, the clamping module 203 clamps the voltage of the drain of the source follower transistor M3 of the pixel unit to a same level, thereby accelerating a signal stabilization speed, improving consistency of establishing the reference signal and the image signal, and improving the image quality.

Figure 19:
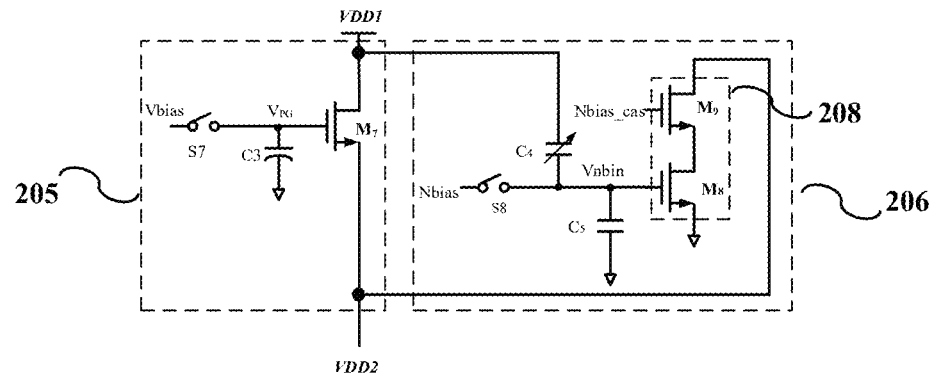
FIG. 19 is a circuit diagram of a correlation power generation module and a noise compensation module in the high gain image sensor of FIG. 18.

Specifically, FIG. 19 is a circuit diagram of a correlation power generation module and a noise compensation module in the high gain image sensor of FIG. 18.

The correlation power generation module 205 includes a source follower transistor M7, a drain of the source follower transistor M7 is connected to the first power supply voltage VDD1, a source of the source follower transistor M7 is connected to the column second power supply voltage output terminal VDD2, and a gate of the source follower transistor M7 samples and latches the first bias voltage Vbias before the reference signal is sampled, and generates the column second power supply voltage VDD2 required by the column signal readout unit that has correlation when sampling the reference signal and sampling the image signal. In other embodiments not shown, those skilled in the art can choose to use a combination of multiple source follower transistors as the source follower as needed to realize a function of the correlation power generation module 205. Adopting the source follower transistor as the correlation power generation circuit 205 has specific advantages, for example, having a simple circuit structure, small region consumption, and an easily programmable output voltage with controllable processing.

Preferably, the gate of the source follower transistor M7 of the correlation power generation module 205 samples the first bias voltage Vbias through a seventh switch S7, holds the first bias voltage Vbias on a third capacitor C3, and performs row-by-row or frame-by-frame sampling and holding before sampling the reference signal.

The noise compensation module 206 includes a current mirror unit 208 with feedback. A bias terminal of the current mirror unit 208 is connected to an output terminal of the first power supply voltage VDD1 through a fourth capacitor C4, and a drain of the current mirror unit 208 is connected to an output terminal of the column second power supply voltage VDD2. The bias terminal of the current mirror unit 208 receives fluctuation of the first power supply voltage VDD1 to change a current flowing out of the column second power supply voltage VDD2, thereby affecting voltage fluctuation of the column second power supply voltage VDD2, forming negative feedback compensation.

Preferably, the current mirror unit 208 in the embodiment is a cascode current mirror which is composed of N-channel Metal-Oxide-Semiconductor (NMOS) M8 and M9. A common gate transistor M9 is used to increase output resistance of the current mirror unit and reduce influence of a drain voltage change on the current of the current mirror unit. A gate Vnbin of the amplifier transistor M8 is connected to a second bias voltage Nbias through an eighth switch S8. S8 is turned on once per row or frame to sample the second bias voltage Nbias and hold it on the fifth capacitor C5. Vnbin is also coupled to the first power supply voltage VDD1 through a fourth capacitor C4. When there is an upward disturbance on the input first power supply voltage VDD1, there is also an upward disturbance on the column second power supply voltage VDD2. However, through processing of the correlation power generation module 205, a disturbance amplitude on the column second power supply voltage VDD2 may be greatly attenuated. The Vnbin voltage is coupled to the first power supply voltage VDD1 by the fourth capacitor C4 and increases accordingly, and a current of an amplifier transistor M8 controlled by Vnbin increases accordingly, the current flowing out of VDD2 increases, and a voltage of VDD2 decreases accordingly, forming a negative feedback compensation, which further suppresses slight disturbance on VDD2; vice versa.

Figure 20:
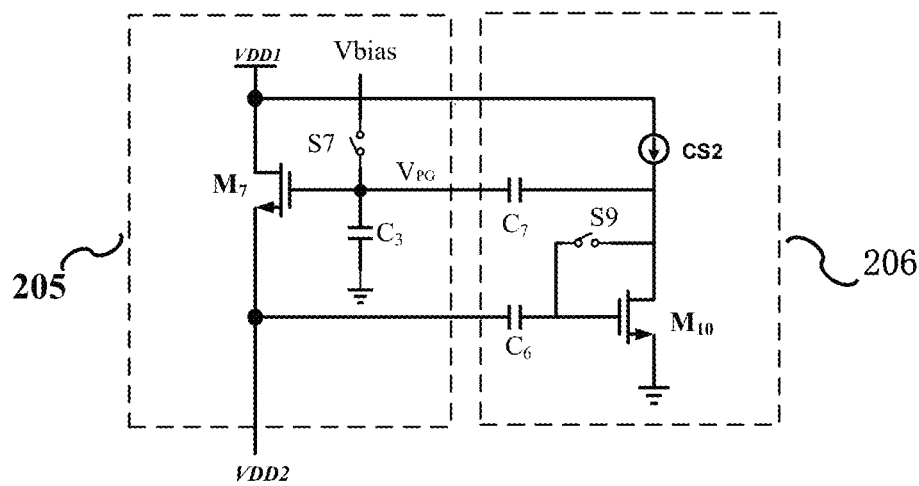
FIG. 20 is another circuit diagram of a correlation power generation module and a noise compensation module in the high gain image sensor of FIG. 18.

FIG. 20 is another circuit diagram of the correlation power generation module 205 and the noise compensation module 206 in the high gain image sensor of FIG. 18.

Figure 21:
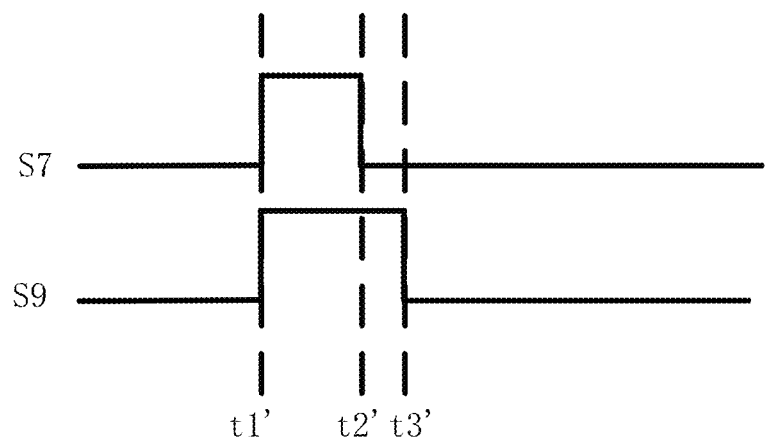
FIG. 21 is a signal timing diagram of the correlation power generation module and the noise compensation module of FIG. 20.

In the embodiment, a structure of the correlation power generation module 205 is the same as that of FIG. 19. A difference lies in that the noise compensation circuit 206 includes an amplifier transistor M10, capacitors C6 and C7, a switch S9 and a current source CS2. Working timing of the noise compensation circuit 206 is shown in FIG. 21. A gate of the amplifier transistor M10 is connected to an output terminal of the column second power supply voltage VDD2 through the sixth capacitor C6, a drain of the amplifier transistor M10 is connected to the current source CS2 and to the gate of the source follower transistor M7 of the correlation power generation circuit through the seventh capacitor C7. A ninth switch S9 is connected between the gate and the drain of the amplifier transistor M10, and DC bias of the amplifier transistor M10 may be achieved by turning on the ninth switch S9 row by row or frame by frame.

As illustrated in FIG. 21, a gate voltage of the source follower transistor M7 in the correlation power generation module 205 is sampled when the seventh switch S7 is turned on, and the ninth switch S9 in the noise compensation circuit 206 samples the first bias voltage Vbias in a time period t1' to t2', while the amplifier transistor M10 performs a reset operation. The sixth capacitor C6 and the seventh capacitor C7 have a voltage DC isolation function, and thus can make the gate of the amplifier transistor M10 at a suitable voltage bias. After t2', the seventh switch S7 is turned off, and the sampling of the gate voltage of the transistor M7 is completed. After t3', the ninth switch S9 is turned off, and a closed-loop negative feedback circuit composed of the transistors M7 and M10 operates. Under the action of voltage negative feedback, output impedance of the column second power supply voltage VDD2 is greatly reduced, further reducing the influence of the power supply noise on the column second power supply voltage VDD2.

Figure 22:
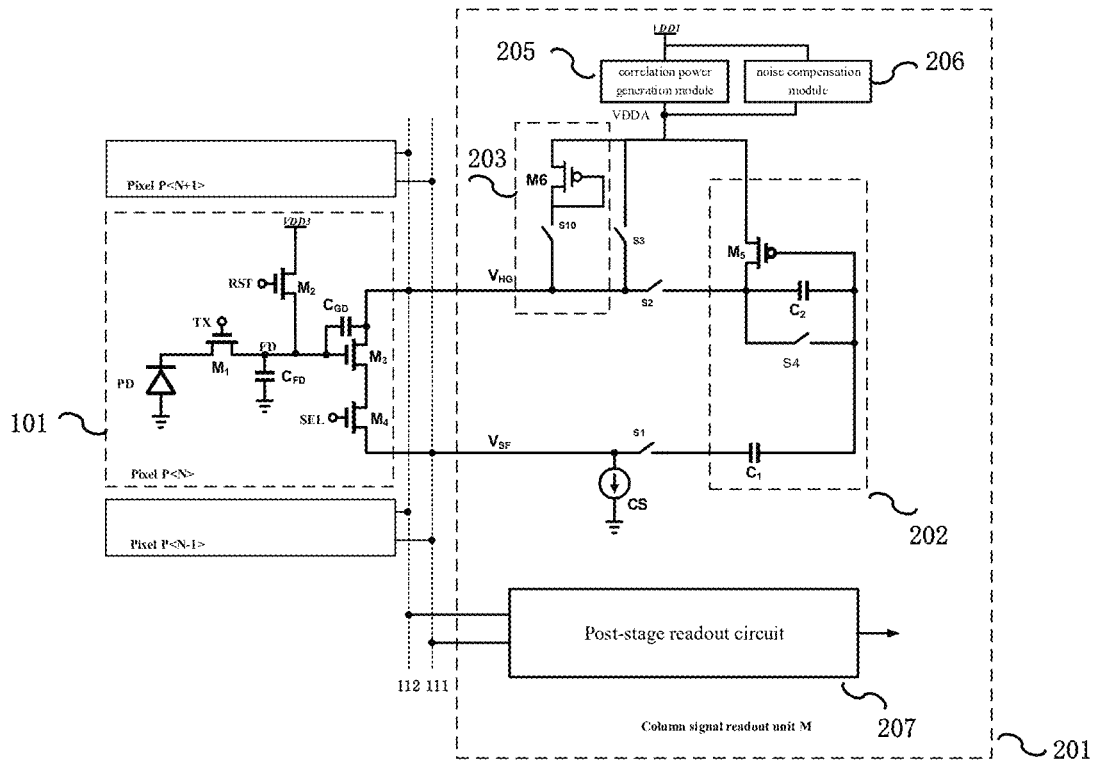
FIG. 22 is a circuit diagram of a clamping module in the high gain image sensor of FIG. 18.

FIG. 22 is a circuit diagram of a clamping module in the high gain image sensor of FIG. 18. In the embodiment, the clamping module 203 includes a clamping transistor M6 and a tenth switch S10. A source of the clamping transistor M6 is connected to the column second power supply voltage VDD2. A gate and a drain of the clamping transistor M6 are connected, and the drain is connected to the column-common current input connecting line 112 (VHG) of the drain of the source follower transistor of the pixel unit through the tenth switch S10. The clamping transistor M6 may be of a fixed size or a variable array with an array-adjustable size.

Figure 23:
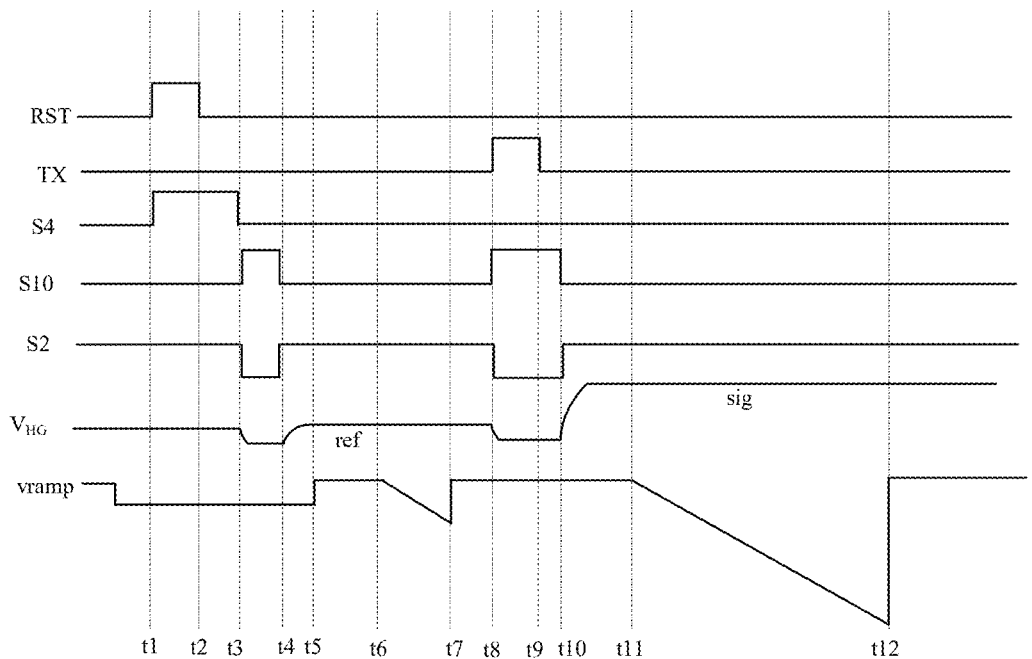
FIG. 23 is a signal timing diagram of the high gain image sensor of FIG. 22 in the SHCG mode.

FIG. 23 is a signal timing diagram of the high gain image sensor of FIG. 22 in the SHCG mode. Within the timing shown in FIG. 23, the first switch S1 is always turned on, and the third switch S3 is always turned off.

During a time period of t1 to t2, the reset transistor M2 in the pixel unit 101 is turned on to reset the FD to the first power supply voltage VDD1, and the fourth switch S4 of the column amplifier PMOS transistor M5 is turned on to reset the column amplifier PMOS transistor M5.

During a time period of t2 to t3, the column amplifier PMOS transistor M5 completes the reset, and the fourth switch S4 is turned off after t3.

During a time period of t3 to t4, the switch S10 is turned on, the switch S2 is turned off, and the clamping module 203 clamps the voltage VHG of the drain of the source follower transistor of the pixel unit to a preset fixed voltage. After t4, the clamping is completed, the switch S10 is turned off, the switch S2 is turned on, and the column-common current input connecting line 112 (V HG) establishes a reset signal ref of the SHCG mode.

During a time period of t4 to t7, the ref signal of the SHCG mode is sampled and quantized.

During a time period of t8 to t10, the transfer transistor M1 in the pixel unit 101 is turned on and then turned off. Similarly, at this time, the clamping module 203 clamps VHG to the same preset fixed voltage.

During a time period of t11 to t12, a sig signal of the SHCG mode is quantified.

Therefore, before sampling the reference signal and sampling the image signal, the voltage of the drain of the source follower transistor of the pixel unit is clamped to the same level by the clamping module, which speeds up a signal stabilization speed, improves consistency of establishing the reference signal and the image signal, and improves image quality.

It should be noted that in the above embodiments, description is provided by taking examples where each column signal readout unit corresponds to one correlation power generation module, each column signal readout unit corresponds to one noise compensation module, and each column signal readout unit corresponds to one clamping module. In other embodiments not shown, those skilled in the art can appropriately select multiple column signal readout units to correspond to one correlation power generation module, multiple column signal readout units to correspond to one noise compensation module, and multiple column signal readout units to correspond to one clamping module for setting as needed.

In summary, in the embodiments of the present disclosure, an internal structure of the pixel unit of the high gain image sensor is consistent with the traditional 3T or 4T pixel, thereby ensuring process compatibility. By merely improving a circuit structure and a connection method of the column signal readout unit, an SHCG is achieved, and a dynamic range in a dark light scene is expanded without introducing power consumption caused by an additional reference voltage and an additional amplifier circuit. A device structure size in the column signal readout unit can be much larger than the transistor in the pixel, which results in better process consistency and more flexible adjustment of the conversion gain. The switching between the SHCG mode and the STD mode can be achieved by driving the switch module in the column signal readout unit without driving the signal in the pixel array, thus, influence on the power supply and ground during operation is smaller, and accordingly stability of the circuit is improved.

Preferably, the first bias voltage is latched by a correlation power generation module and the column second power supply voltage is output to the source of the column PMOS amplifier transistor, to make the power supply of the column signal readout unit has correlation when sampling the reference signal and sampling the image signal, thereby eliminating the influence of power supply noise on the correlated double sampling and improving imaging quality. The noise compensation module senses the fluctuation of the first power supply voltage or the column second power supply voltage and generates a negative feedback signal to act on the column second power supply voltage to suppress the fluctuation of the column second power supply voltage and further reduce the power supply noise. Before the reference signal is sampled and the image signal is sampled, the voltage of the drain of the source follower transistor of the pixel unit is clamped to the same level by a clamping module respectively, thereby accelerating a signal stabilization speed, improving consistency of establishing the reference signal and the image signal, and improving image quality.

It is obvious to those skilled in the art that the present disclosure is not limited to the details of the exemplary embodiments described above, and that the present disclosure can be implemented in other specific forms without departing from the spirit or essential features of the present disclosure. Therefore, in any case, the embodiments should be regarded as exemplary and non-restrictive. In addition, it is obvious that the word "including" does not exclude other elements and steps, and the wording "a" does not exclude the plural. Multiple elements stated in the device claim may also be implemented by one element. The words first, second, etc. are used to indicate names, and do not indicate any particular order.

What is claimed is:

1. A control method of a high gain image sensor, wherein the high gain image sensor comprises a plurality of columns of pixel units arranged in an array, each column of pixel units has a column-common current input connecting line and a column-common current output connecting line, a gate of a source follower transistor of each pixel unit in each column is connected to a respective floating diffusion region, a drain of the source follower transistor of each pixel unit in each column is connected to the column-common current input connecting line, and a source of the source follower transistor of each pixel unit in each column is connected to the column-common current output connecting line directly or through respective row selection transistors;

the column-common current input connecting line and the column-common current output connecting line are connected to a column signal readout unit;

the column signal readout unit comprises a column bias current source and a column P-channel Metal-Oxide-Semiconductor (PMOS) amplifier transistor, wherein the column bias current source is connected to the column-common current output connecting line, a drain of the column PMOS amplifier transistor is connected to the column-common current input connecting line, and a gate of the column PMOS amplifier transistor is connected to the column-common current output connecting line directly or through a capacitor, to acquire an amplified signal of a floating diffusion region of a readout row pixel unit on the column-common current input connecting line.

2. The method according to claim 1, wherein in response to the gate of the column PMOS amplifier transistor being connected to the column-common current output connecting line through a first capacitor, a second capacitor is provided between the gate and the drain of the column PMOS amplifier transistor, and a magnification by which the column signal readout unit amplifies the signal of the floating diffusion region of the readout row pixel unit on the column-common current input connecting line is changed by changing a ratio of the first capacitor to the second capacitor.

3. The method according to claim 1, wherein the column signal readout unit further comprises a correlation power generation module, through which a first bias voltage is latched and a column second power supply voltage is output to a source of the column PMOS amplifier transistor, to make a power supply of the column signal readout unit has correlation when sampling a reference signal and sampling an image signal, so as to eliminate influence of power supply noise on correlated double sampling.

4. The method according to claim 3, wherein the correlation power generation module comprises at least one source follower transistor which has a drain connected to a first power supply voltage, a source connected to an output terminal of the column second power supply voltage, and a gate configured to sample and latch the first bias voltage before the reference signal is sampled, and generate the column second power supply voltage required by the column signal readout unit that has correlation when sampling the reference signal and sampling the image signal.

5. The method according to claim 4, wherein the gate of the source follower transistor of the correlation power generation module samples the first bias voltage through a seventh switch and holds the first bias voltage on a third capacitor, and performs row-by-row or frame-by-frame sampling and holding before the reference signal is sampled.

6. The method according to claim 4, wherein the column signal readout unit further comprises a noise compensation module which senses fluctuation of the first power supply voltage or the column second power supply voltage and generates a negative feedback signal to act on the column second power supply voltage to suppress the fluctuation of the column second power supply voltage.

7. The method according to claim 6, wherein the noise compensation module comprises a current mirror unit having a bias terminal connected to an output terminal of the first power supply voltage through a fourth capacitor, and a drain connected to the output terminal of the column second power supply voltage.

8. The method according to claim 7, wherein the bias terminal of the current mirror unit samples a second bias voltage through an eighth switch and holds the second bias voltage on a fifth capacitor to perform row-by-row or frame-by-frame sampling and holding.

9. The method according to claim 7, wherein the current mirror unit is a cascode current mirror.

10. The method according to claim 6, wherein the noise compensation module comprises an amplifier transistor having a gate connected to the output terminal of the column second power supply voltage through a sixth capacitor, and a drain connected to a current source and to the gate of the source follower transistor of the correlation power generation module through a seventh capacitor, wherein a ninth switch is connected between the gate and the drain of the amplifier transistor, and DC bias of the amplifier transistor is achieved by turning on the ninth switch row by row or frame by frame.

11. The method according to claim 1, wherein the column signal readout unit further comprises a clamping module, and before the reference signal is sampled and the image signal is sampled, a voltage of the drain of the source follower transistor of the pixel unit is clamped to a same level by the clamping module respectively.

12. The method according to claim 11, wherein the clamping module comprises a clamping transistor having a source connected to the column second power supply voltage, and a gate and a drain connected with each other, wherein the drain of the clamping transistor is connected to the drain of the source follower transistor of the pixel unit through a tenth switch.

13. The method according to claim 1, comprising:
sampling a first reference signal output from the source of the source follower transistor of the pixel unit to the column signal readout unit;
sampling a second reference signal output from the drain of the source follower transistor of the pixel unit to the column signal readout unit; and
turning on a transfer transistor of the pixel unit, and sampling an image signal output from the pixel unit to the column signal readout unit.

14. The method according to claim 13, wherein said sampling the image signal output from the pixel unit to the column signal readout unit comprises:
making determination based on a voltage signal read from the pixel unit;
in response to determining that it is a high illumination condition, sampling a first image signal output from the source of the source follower transistor of the pixel unit to the column signal readout unit, the pixel unit having a first conversion gain; and
in response to determining that it is a low illumination condition, sampling a second image signal output from the drain of the source follower transistor of the pixel unit to the column signal readout unit, the pixel unit having a second conversion gain;
wherein the second conversion gain is higher than the first conversion gain.

15. The method according to claim 14, wherein said making determination based on the voltage signal read from the pixel unit comprises:
comparing a change amplitude of the voltage signal read from the pixel unit before and after the transfer transistor is turned on with a threshold voltage, determining that it is the low illumination condition in response to the change amplitude being less than or equal to the threshold voltage, and determining that it is the high illumination condition in response to the change amplitude being greater than the threshold voltage.

16. The method according to claim 15, wherein a falling interval of a ramp voltage obtained by analog-to-digital conversion is used as the threshold voltage.

17. The method according to claim 13, wherein said sampling the image signal output from the pixel unit to the column signal readout unit comprises:
sampling a second image signal output from the drain of the source follower transistor of the pixel unit to the column signal readout unit, the pixel unit having a second conversion gain; and
sampling a first image signal output from the source of the source follower transistor of the pixel unit to the column signal readout unit, the pixel unit having a first conversion gain;
wherein the second conversion gain is higher than the first conversion gain.

18. The method according to claim 14, wherein to output the first image signal from the source of the source follower transistor of the pixel unit to the column signal readout unit, the first conversion gain is adjusted by a dual conversion gain control transistor of the pixel unit.

19. The method according to claim 13, wherein outputting the first or second reference signal from the source or drain of the source follower transistor of the pixel unit to the column signal readout unit is controlled by a switch module.

20. The method according to claim 17, wherein to output the first image signal from the source of the source follower transistor of the pixel unit to the column signal readout unit, the first conversion gain is adjusted by a dual conversion gain control transistor of the pixel unit.

* * * * *